United States Patent [19]

Risco et al.

[11] 3,723,542
[45] Mar. 27, 1973

[54] PROCESS FOR PRODUCING 2-PINANOL

[75] Inventors: Rocco R. Risco, Oradell; Seymour Lemberg, Elizabeth, both of N.J.

[73] Assignee: Stepan Chemical Company, Maywood, N.J.

[22] Filed: Jan. 23, 1970

[21] Appl. No.: 5,364

[52] U.S. Cl. ............................260/631.5, 260/610 B
[51] Int. Cl. ........................C07c 35/22, C07c 73/00
[58] Field of Search ........................260/631.5, 610 B

[56] References Cited

UNITED STATES PATENTS

| | | | |
|---|---|---|---|
| 2,790,004 | 4/1957 | Dougherty | 260/610 B |
| 2,798,096 | 7/1957 | Baumgartner | 260/610 B |
| 3,256,315 | 6/1960 | David et al. | 260/635 R |
| 2,735,870 | 2/1956 | Fisher et al. | 260/610 B |
| 3,567,786 | 3/1971 | Bostian et al. | 260/618 C |

FOREIGN PATENTS OR APPLICATIONS 1,019,649      1966    Great Britain.....................260/631.5

OTHER PUBLICATIONS

Schmidt et al., "J. Am. Chem. Soc.," Vol. 81, (1959), pages 445 to 448, Q01A5.
Fisher et al., "J. Am. Chem. Soc.," Vol. 75, (1953), pages 3675 to 3678.

*Primary Examiner*—Howard T. Mars
*Assistant Examiner*—Joseph E. Evans
*Attorney*—Kenyon & Kenyon Reilly Carr & Chapin

[57] ABSTRACT

2-Pinanol is obtained upon oxidation of pinane in the presence of base, such as sodium hydroxide, and a free radical initiator, such as azobisisobutyronitrile. Oxygen is introduced into a mixture (anhydrous or aqueous) of pinane, base and initiator until the desired yield of pinanol is obtained, and the pinanol is recovered, as by extraction and distillation.

12 Claims, No Drawings

PROCESS FOR PRODUCING 2-PINANOL

This invention relates to a method for producing 2-pinanol. More particularly, this invention is concerned with a method for oxidizing pinane to 2-pinanol.

It has been previously proposed to produce 2-pinanol from pinane by a two-step process involving oxidation of pinane to form 2pinane hydroperoxide, followed by reduction of the hydroperoxide to 2-pinanol, as by treatment with sodium sulfite or lithium aluminum hydride or by hydrogenation. See, for example, Filliatre et al., Bull. Soc. Chem., Vol. 10, (No. 657) pp. 4141–45 (1968). Such processes have not been economically feasible, however, because they generally require expensive reagents, give poor yields, and/or lead to a wide variety of side products making separation of the desired product quite difficult.

It is an object of this invention to provide an economical synthesis of 2-pinanol from pinane.

It is another object to obtain 2-pinanol from pinane in a single reaction step.

A still further object of this invention is to provide a method for converting pinane to 2-pinanol using using inexpensive, readily available reagents.

Still other objects will be apparent from the ensuing specification and appended claims.

It now has been found that pinane can be oxidized directly to 2-pinanol if the oxidation is effected in the presence of base, which can be an organic or inorganic base. Because, as will be discussed below, the use of aqueous media offers certain advantages, bases which are soluble in water, or at least dispersible in water, are desired. Of the inorganic bases, the alkali metal hydroxides and alkaline earth metal hydroxides, e.g., lithium, sodium, potassium and calcium hydroxides, are preferred. Organic bases which can be employed include alkali metal alkoxides such as sodium methoxide and sodium ethoxide; alkali metal aryloxides, such as sodium phenoxides; amines, including aliphatic amines, lauryl amine, dihexylamine and the like, and aromatic tertiary amines such as pyridine, lutidine and quinoline. Still other bases, such as ammonia, sodamide and the like may be used. Inorganic bases, especially sodium and potassium hydroxide, are preferred.

Absent the presence of base, the oxidation yields a mixture of products. The base in some unknown manner directs the reaction preferentially to 2-pinanol. The amount of base which is employed will vary, depending upon the base, but in general the amount of base will be in the range of from about 1 to about 100 weight per cent, based upon pinane. When either potassium or sodium hydroxide is the preferred base amounts are in the range of from about 5 to about 15 weight per cent, based upon pinane If the base is solid and insoluble in the reaction medium, it is desirably employed in finely divided form, i.e., in a pulverized form having particle sizes of less than about 100 mesh. Water-soluble inorganic bases, such as sodium hydroxide, can also be employed in aqueous form When water is present, it is desirably present in amounts of at least about 5 weight per cent, based upon the weight of pinane. At lower amounts a gel is formed which materially retards the rate of the reaction under normal means of agitation. The maximum permissible amount is dictated only by practical considerations, such as reactor size, heat transfer and the like normally encountered with an inert diluent, and in general amounts in excess of about 100 weight per cent are undesirable.

Although the base is desirably non-volatile, i.e., solid or liquid under the reaction conditions, volatile bases, such as ammonia or low boiling amines can be employed, in which case they are conveniently fed to the reaction in the oxygen feed stream.

The pinane used as a feed stock for the process of this invention is desirably rich, preferably at least about 90 per cent, in cis-pinane, since this isomer is active under the reaction conditions, whereas the trans isomer is highly resistant to oxidation. By the term cis-pinane, as employed herein, is meant that isomer wherein the gem-dimethyls are cis to the other methyl substituent, as illustrated by the formula:

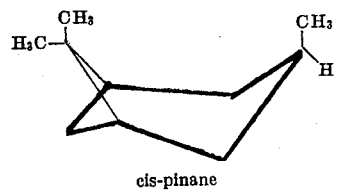

cis-pinane

Oxygen for the reaction can be derived from any suitable source, including peroxides, such as hydrogen peroxide. For reasons of economy, however, gaseous oxygen is preferred, and in such state may be supplied in pure form, or diluted with inert gases, such as nitrogen. Air is a suitable source of gaseous oxygen, but it is preferably treated to remove carbon dioxide prior to use to avoid reaction with the base or formation of acid when aqueous medium is employed.

In addition to base, pinanol and oxygen (and optionally water), there is preferably employed a free-radical initiator. The oxidation is believed to be a free-radical reaction, and long induction times are encountered until the free-radical concentration has built up to a level sufficient to allow the reaction to proceed. This induction time is reduced by the use of free-radical initiators, such as organic peroxides and azo compounds, which form free radicals under the reaction conditions. Diacyl peroxides, which form acid decomposition products, are not desirable. The azo compounds are particularly preferred, with azobisisobutyronitrile being most preferred. The amount of free-radical initiator is not critical, and generally is in the range of from about 0.001 to about 0.1 weight per cent, based upon pinane.

The reaction is generally conducted at elevated temperatures, with temperatures in the range of from about 80° to about 120° C. being preferred. Higher temperatures can be employed if desired, but generally lead to side products which are difficult to isolate and many preclude use of the product 2-pinanol in many areas. Temperatures of less than about 802 C. may be employed, but the reaction rates decrease with temperature and below 80° C. are too slow for most commercial purposes.

The oxygen pressure (or partial pressure) is not critical, except that reaction rate increases with pressure. In general, oxygen pressures of about one atmosphere have been found suitable, although higher and lower pressures, e.g., 0.1 to 10 or more atmospheres, can be used.

The oxidation can be carried out in any suitable fashion, i.e., batch-wise, continuously or semi-continuously. In a presently preferred technique, oxygen is bubbled through a stirred reactor containing pinane, initiator, base and, preferably, water until the desired conversion of pinane to 2-pinanol is achieved. In general, it is desired to stop the reaction before the formation of excessive amounts of side products, at which point the conversion of pinane ordinarily will be in excess of about 25 per cent.

The 2-pinanol product of the process of this invention comprises a mixture of the cis- and trans-isomers, with the trans-isomer predominating (normally about 80 percent). By the term "trans-2-pinanol," as used herein, is meant the pinanol derivative wherein the hydroxyl group is trans with respect to the gem-dimethyls, as shown by the formula:

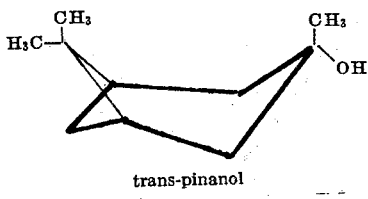

trans-pinanol

This nomenclature is inconsistent with that employed in several publications, but is consistent with that used by the above-mentioned Filliatre et al., who refer to this compound as the trans-isomer.

The 2-pinanol is recovered by conventional techniques, such as fractional distillation, extraction and the like. When a water soluble base is employed, the reaction mixture is desirably extracted with water to remove the base. For example, the reaction mixture can be extracted with water and, after separation of the aqueous and organic phases, the organic phase is distilled to recover unreacted pinane, which can be recycled, and product 2-pinanol. In another technique, the reaction mixture can be steam distilled to recover a pinane-water mixture (about 53 weight per cent pinane) and then a pinanol-water mixture (about 30 weight per cent pinanol). The pinane and pinanol are separately recovered from the water by allowing the water and organic phases to settle and decanting. The use of steam distillation offers the advantage that, when base is present, certain side products, e.g., peroxides, are destroyed, thus minimizing subsequent purification problems.

In some instances it has been found that the reactive product includes 2-pinane hydroperoxide, sometimes in amounts as high as about 10 parts per 90 parts pinanol. To increase the efficiency of the process, the product may be treated with a suitable reducing agent, e.g., sodium sulfite, lithium aluminum hydride or hydrogen, to convert the hydroperoxide to 2-pinanol.

The following examples are illustrative:

EXAMPLE 1

A stirred reactor was charged with 1500 grams pinane (92–97 per cent cis-pinane), 105 grams of finely powdered sodium hydroxide and 0.1 grams of azobisisobutyronitrile. The reaction mixture was then heated to 110° to 115° C. and oxygen was bubbled through the mixture at a rate in excess of the rate of absorption of the reaction mixture for about 24 hours. About 100 grams of oxygen were taken up during this period.

The reaction mixture was admixed with 1000 grams of water and the aqueous and organic phases were separated. The organic phase was distilled at 10 – 15 mm Hg absolute pressure to yield 1200 grams of unreacted pinane at about 58°–68° C., then the pressure was reduced to 0.2 mm Hg absolute and 225 grams of 82.6 percent 2-pinanol distilled at about 70° C.; a residue remained in the still amounting to about 23 grams. Nineteen grams additional pinane was recovered from the vacuum traps. Thus, at 19.4 per cent conversion of pinane, the yield of pinanol (as an about 80/20 trans/cis mixture) was 61.8 percent, based on pinane.

EXAMPLE 2

The procedure of Example 1 was repeated, except that 210 grams of 50 percent aqueous sodium hydroxide was substituted for the solid sodium hydroxide, and the reaction was terminated after 8 hours, during which time 124 grams of oxygen were absorbed. After extraction with water, the organic phase was distilled at 10–15 mm Hg to yield 1137 grams pinane at 58°–68° C.; the pressure was reduced to 0.2 mm Hg and 85.4 percent 2-pinanol was distilled at about 70° C. Eighteen grams of additional pinane were recovered in the cold traps. The yield therefore was 67.0 percent of an 80/20 mixture of trans- and cis-pinanols, based upon pinane, giving a 23 per cent conversion.

What is claimed is:

1. In a process for oxidizing pinane by reaction with oxygen, the improvement of effecting said reaction at a temperature of from about 80° to about 120° C. in contact with from about 5 to about 15 weight percent, based upon pinane, of a base selected from the group consisting of an alkali metal hydroxide, an alkaline earth metal hydroxide, an alkali metal alkoxide, an alkali metal aryloxide, ammonia and sodamide, whereby 2-pinanol is the major oxidation product.

2. A process according to claim 1 wherein said pinane is predominantly cis-pinane.

3. A process according to claim 2 wherein said base is an inorganic base selected from the group consisting of an alkali metal hydroxide, an alkaline earth metal hydroxide, ammonia and sodamide.

4. A process according to claim 3 wherein said inorganic base is an alkali metal hydroxide.

5. A process according to claim 4 wherein said alkali metal hydroxide is sodium hydroxide.

6. A process according to claim 4 wherein said alkali metal hydroxide is potassium hydroxide.

7. A process for producing 2-pinanol from pinane which comprises bubbling oxygen into a mixture of pinane, from about 5 to about 15 weight percent, based upon pinane, of a base selected from the group consisting of an alkali metal hydroxide, an alkaline earth metal hydroxide, an alkali metal alkoxide, an alkali metal aryloxide, ammonia and sodamide, and from about 0.001 to about 0.1 weight percent, based upon pinane, of azobisisobutyronitrile, at a temperature of from about 80° to about 12° C. and for a time sufficient to yield 2-pinanol as the major oxidation product.

8. A process according to claim 7 wherein said pinane is predominantly cis-pinane.

9. A process according to claim 8 wherein said base is an inorganic base selected from the group consisting of an alkali metal hydroxide, an alkaline earth metal hydroxide, ammonia and sodamide.

10. A process according to claim 9 wherein said base is alkali metal hydroxide.

11. A process according to claim 10 wherein said alkali metal hydroxide is sodium hydroxide.

12. A process according to claim 10 wherein said alkali metal hydroxide is potassium hydroxide.

* * * * *